US012644952B2

(12) United States Patent
Furuyama

(10) Patent No.: US 12,644,952 B2
(45) Date of Patent: Jun. 2, 2026

(54) RADIO WAVE MAP PROVIDING DEVICE, RADIO WAVE MAP PROVIDING METHOD, AND NON-TRANSITORY COMPUTER READABLE MEDIUM STORING RADIO WAVE MAP PROVIDING PROGRAM

(71) Applicant: DENSO CORPORATION, Kariya-city (JP)

(72) Inventor: Takahiro Furuyama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 459 days.

(21) Appl. No.: 18/318,151

(22) Filed: May 16, 2023

(65) Prior Publication Data

US 2023/0288525 A1 Sep. 14, 2023

Related U.S. Application Data

(63) Continuation of application No. PCT/JP2021/034427, filed on Sep. 17, 2021.

(30) Foreign Application Priority Data

Dec. 4, 2020 (JP) ................................. 2020-201904

(51) Int. Cl.
*H04W 48/16* (2009.01)
*G01S 5/02* (2010.01)

(52) U.S. Cl.
CPC ......... *G01S 5/02521* (2020.05); *H04W 48/16* (2013.01)

(58) Field of Classification Search
CPC ..... H04W 72/51; H04W 4/029; H04W 16/28; H04W 16/64; H04W 64/00

(Continued)

(56) References Cited

U.S. PATENT DOCUMENTS 10,136,263 B2 * 11/2018 Nakata .................. H04W 4/029
10,412,552 B2 * 9/2019 Nakata ................ H04L 25/0204
(Continued)

FOREIGN PATENT DOCUMENTS

EP 4258721 A1 * 10/2023 ......... G01S 5/02521
EP 4258721 B1 * 4/2025 ............ H04W 48/16
(Continued)

OTHER PUBLICATIONS

S. Tsurumi and T. Fujii, "Reliable vehicle-to-vehicle communication using spectrum environment map," 2018 International Conference on Information Networking (ICOIN), Chiang Mai, Thailand, 2018, pp. 310-315, doi: 10.1109/ICOIN.2018.8343131. (Year: 2018).*

*Primary Examiner* — William D Cumming
(74) *Attorney, Agent, or Firm* — Harness, Dickey & Pierce, P.L.C.

(57) ABSTRACT

By a radio wave map providing device, a radio wave map providing device, or a non-transitory computer readable medium storing a radio wave map providing program, a radio wave map is stored, a radio wave map request is received; an information amount of reference communication quality information equal to or greater than request communication quality information is compared with an information amount of reference communication quality information equal to or less than the request communication quality information, and a radio wave map reply is generated based on the reference communication quality information having a smaller information amount and reference position information, and transmitted.

10 Claims, 8 Drawing Sheets

(58) Field of Classification Search
USPC ........................................................ 370/329
See application file for complete search history.

(56) References Cited

U.S. PATENT DOCUMENTS

| | | | |
|---|---|---|---|
| 12,228,663 B2 * | 2/2025 | Nakata .................. | H04W 64/00 |
| 2015/0223027 A1 | 8/2015 | Ahn et al. | |
| 2016/0370191 A1 | 12/2016 | Utsugi et al. | |
| 2017/0223733 A1 * | 8/2017 | Nakata .................. | H04W 72/51 |
| 2019/0053011 A1 * | 2/2019 | Nakata ................ | H04L 25/0204 |
| 2019/0253948 A1 | 8/2019 | Nagura et al. | |
| 2021/0070317 A1 | 3/2021 | Hitotsumatsu et al. | |
| 2021/0325207 A1 | 10/2021 | Lin et al. | |
| 2022/0342029 A1 * | 10/2022 | Nakata .................. | H04W 16/28 |
| 2023/0246758 A1 * | 8/2023 | Furuyama ............... | H04L 5/006 |
| | | | 370/329 |
| 2023/0288525 A1 * | 9/2023 | Furuyama .......... | G01C 21/3811 |

FOREIGN PATENT DOCUMENTS

| | | | | |
|---|---|---|---|---|
| JP | 2017009781 A | | 1/2017 | |
| JP | 2019140563 A | | 8/2019 | |
| JP | 2019203823 A | | 11/2019 | |
| JP | 2022063929 A | * | 4/2022 | ............ H04W 16/18 |
| JP | 2022089484 A | * | 6/2022 | ......... G01S 5/02521 |
| JP | 2022166767 A | * | 11/2022 | ......... G01S 5/02521 |
| JP | 7347512 B2 | * | 9/2023 | ............. H04W 4/44 |
| JP | 7354997 B2 | * | 10/2023 | ......... G01S 5/02521 |
| JP | 7405058 B2 | * | 12/2023 | ............ H04W 24/08 |
| JP | 2024066150 A | * | 5/2024 | ............ H04W 36/30 |
| JP | 7619142 B2 | * | 1/2025 | ........ H04W 72/1263 |
| WO | WO-2020/133088 A1 | | 7/2020 | |
| WO | WO-2021024976 A1 | * | 2/2021 | ............ H04B 7/0874 |
| WO | WO-2022079980 A1 | * | 4/2022 | ............ H04W 16/18 |
| WO | WO-2022118520 A1 | * | 6/2022 | ......... G01S 5/02521 |
| WO | WO-2022153636 A1 | * | 7/2022 | ............ H04W 24/10 |
| WO | WO-2024095735 A1 | * | 5/2024 | ............ H04W 36/30 |

* cited by examiner

RADIO WAVE MAP PROVIDING DEVICE, RADIO WAVE MAP PROVIDING METHOD, AND NON-TRANSITORY COMPUTER READABLE MEDIUM STORING RADIO WAVE MAP PROVIDING PROGRAM

CROSS REFERENCE TO RELATED APPLICATIONS

The present application is a continuation application of International Patent Application No. PCT/JP2021/034427 filed on Sep. 17, 2021, which designated the U.S. and claims the benefit of priority from Japanese Patent Application No. 2020-201904 filed on Dec. 4, 2020. The entire disclosures of all of the above applications are incorporated herein by reference.

TECHNICAL FIELD

The present disclosure relates to a device and the like related to a radio wave map, and mainly related to a radio wave map providing device implemented by a server, a method implemented by the radio wave map providing device, and a program executed by the radio wave map providing device.

BACKGROUND

With the spread of wireless communication, opportunities to perform communication using the wireless communication are increasing in various places. In particular, regarding a mobile object such as an automobile, attention is being paid to technologies for performing driving assistance and automated driving control using high-capacity cellular communication, V2X such as vehicle-to-vehicle communication and road-to-vehicle communication. Along with this, vehicles have come to be equipped with a communication function, and vehicles are becoming more connected.

SUMMARY

By a radio wave map providing device, a radio wave map providing device, or a non-transitory computer readable medium storing a radio wave map providing program, a radio wave map is stored, a radio wave map request is received; an information amount of reference communication quality information equal to or greater than request communication quality information is compared with an information amount of reference communication quality information equal to or less than the request communication quality information, and a radio wave map reply is generated based on the reference communication quality information having a smaller information amount and reference position information, and transmitted.

DETAILED DESCRIPTION

Figure 1:
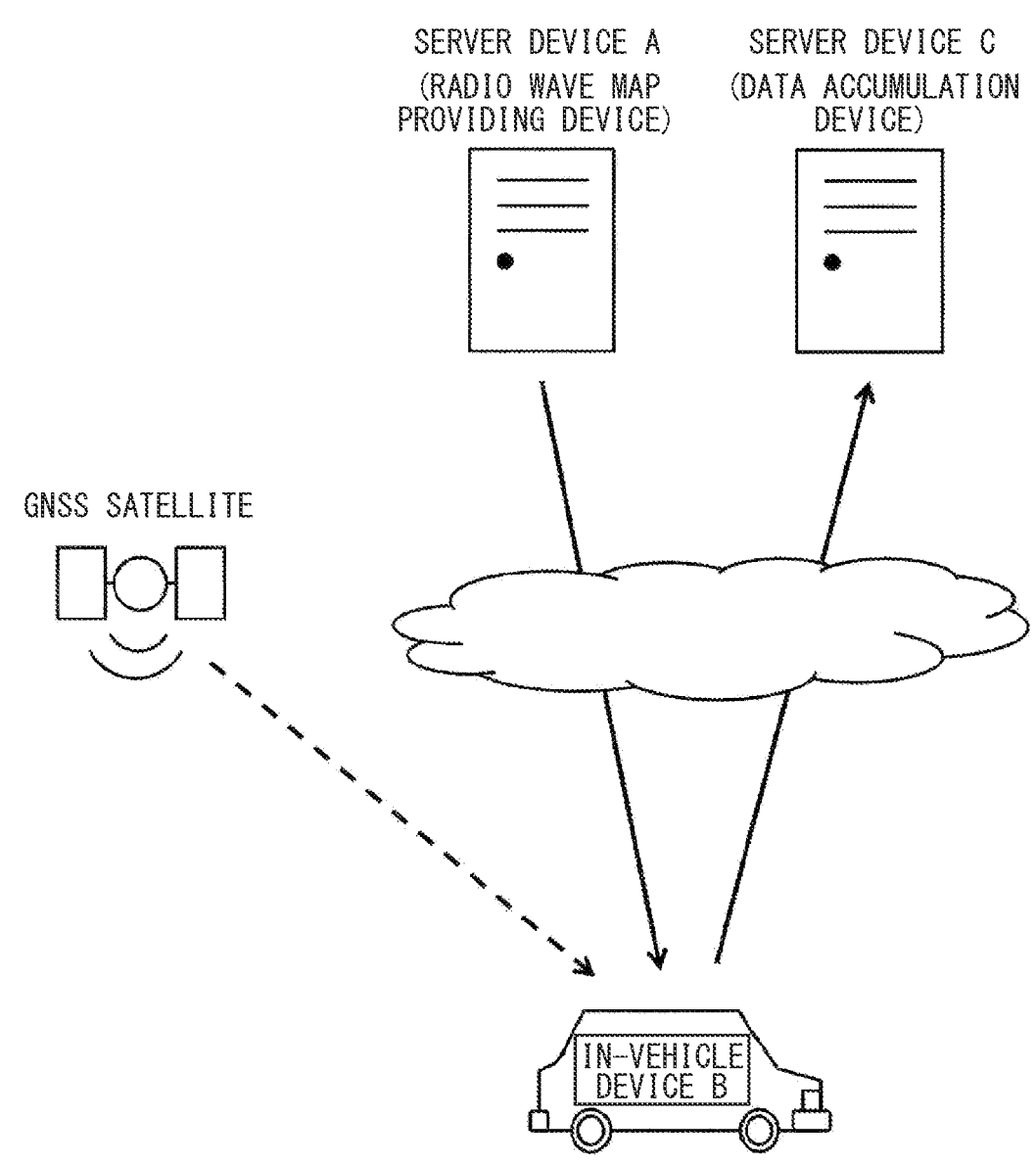
FIG. 1 is a diagram showing an overall configuration according to an embodiment of the present disclosure.

In wireless communication, radio waves interfere with each other, thereby the strength and weakness of the transmission level and reception level of radio waves occur depending on the location. This phenomenon is generally called fading. Since mobile objects such as automobiles are assumed to move, a communication quality changes with the movement. Therefore, it is possible to take measure in advance by assessing a communication quality at a certain location in advance.

In a comparative example, a communication resource map indicating a correspondence relationship between a position and an amount of communication resources estimated to be available for communication at the position.

Here, as a result of detailed consideration by the inventor, the inventor found the following difficulty. The mobile object such as the automobile receives in advance a communication resource map of a position to which the mobile object is scheduled to move from a device having the communication resource map showing a correspondence relationship between the position and the amount of communication resources, so that it is possible to schedule the communication in consideration of the fading. However, when a map of the entire route along which an automobile or the like is scheduled to travel is transmitted or received, the amount of communication may become enormous. Furthermore, since the route of the automobile or the like changes as appropriate according to road conditions and occupant conditions. Therefore, when a new map is provided each time the route is changed, the amount of communication required for transmission and reception of the map further increases.

Therefore, one example of the present disclosure reduces the amount of communication required for transmitting and receiving a radio wave map while providing information necessary for communication scheduling of a mobile object.

According to one example embodiment, a radio wave map providing device is used for receiving a radio wave map request from a radio wave map acquisition-utilization device mounted on a mobile object and transmitting necessary information. The radio wave map providing device includes: a radio wave map storage that stores a radio wave map including reference position information indicating a reference position and reference communication quality information indicating a communication quality at the reference position; a receiver that receives the radio wave map request including movement section information indicating a movement schedule section of the mobile object and request communication quality information indicating a requested communication quality; a radio wave map reply generation unit that compares, in the reference communication quality information at the reference position in the movement schedule section, an information amount of reference communication quality information equal to or greater than the request communication quality information with an information amount of reference communication quality information equal to or less than the request communication quality information, and generates a radio wave map reply based on provision reference communication quality information that is the reference communication quality information having a smaller information amount and provision reference position information that is reference position information according to the reference communication quality information; and a transmitter that transmits the radio wave map reply. According to another example embodiment, a radio wave map providing method is performed by a radio wave map providing device for receiving a radio wave map request from a radio wave map acquisition-utilization device mounted on a mobile object and transmitting necessary information. The radio wave map providing device includes a radio wave map storage that stores a radio wave map including reference position information indicating a reference position and reference communication quality information indicating a communication quality at the reference position. The method includes; receiving the radio wave map request including movement section information indicating a movement schedule section of the mobile object and request communication quality indicating a requested communication quality; comparing, in the reference communication quality information at the reference position in the movement schedule section, an information amount of reference communication quality information equal to or greater than the request communication quality information with an information amount of reference communication quality information equal to or less than the request communication quality information; generating a radio wave map reply based on provision reference communication quality information that is the reference communication quality information with a smaller information amount and provision reference position information that is reference position information according to the reference communication quality information; and transmitting the radio wave map reply.

Further, according to another example embodiment, a radio wave map providing program is executable by a radio wave map providing device for receiving a radio wave map request from a radio wave map acquisition-utilization device mounted on a mobile object and transmitting necessary information. The radio wave map providing device includes a radio wave map storage that stores a radio wave map including reference position information indicating a reference position and reference communication quality information indicating a communication quality at the reference position. The radio wave map providing program causes the radio wave map providing device to: receive the radio wave map request including movement section information indicating a movement schedule section of the mobile object and request communication quality indicating a requested communication quality; compare, in the reference communication quality information at the reference position in the movement schedule section, an information amount of reference communication quality information equal to or greater than the request communication quality information with an information amount of reference communication quality information equal to or less than the request communication quality information, and generates a radio wave map reply based on provision reference communication quality information that is the reference communication quality information having a smaller information amount and provision reference position information that is reference position information according to the reference communication quality information; and transmit the radio wave map reply.

With the configuration as described above, it is possible to reduce the amount of communication when transmitting the radio wave map while providing the radio wave map necessary for the radio wave map acquisition-utilization device.

The following will describe embodiments of the present disclosure with reference to the drawings.

1. Overall Configuration Including Related Devices

An overall configuration showing devices related in the present embodiment and their interrelationships will be described with reference to FIG. 1.

A server device A corresponds to a radio wave map providing device of each embodiment, stores a radio wave map, and transmits the radio wave map via a communication network in response to a radio wave map request from an in-vehicle device B. The radio wave map stored in the server device A is generated by any method, and the method for generating it will not be described in this specification. The server device A may have a function as a radio wave map generation device in addition to a function as the radio wave map providing device.

It is assumed that a communication network between the server device A and the in-vehicle device B uses a wireless communication system. As the wireless communication network, for example IEEE802.11 (Wi-Fi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, 5G, and the like can be used. Alternatively, Dedicated Short Range Communication (DSRC) can be used.

A combination of the wireless communication system and the wired communication system may be used as the communication network. For example, the in-vehicle device B and a base station in a cellular system may be connected to each other via a wireless communication system, and the base station device and the subsequent device may be connected to each other via a wired communication system such as a core line of a communication carrier or the Internet.

The in-vehicle device B "mounted" on a vehicle, which is a "mobile object", corresponds to a radio wave map acquisition-utilization device of each embodiment. The in-vehicle device B transmits the radio wave map request to the server device A via the communication network, and receives the radio wave map reply, which is information corresponding to the contents of the radio wave map request, from the server device A via the communication network. The in-vehicle device B receives positioning signals from GNSS satellites and acquires position information of the vehicle. The in-vehicle device B further uses the radio wave map reply transmitted from the server device A to transmit various data acquired by the vehicle to a server device C. The server device C is a data accumulation device that accumulates data transmitted from the in-vehicle device B.

The "mobile object" refers to a movable object, and a movement speed may be arbitrary. Naturally, this also includes a case where the mobile object is stopped. Examples of the mobile object include automobiles, motorcycles, bicycles, pedestrians, ships, aircrafts, and objects mounted thereon. However, the mobile object is not limited to these. The term "mounted" includes not only a case where an object is directly fixed to the mobile object but also a case where an object is moved together with the mobile object although the object is not fixed to the mobile object. For example, the case may be a case where a person riding on the mobile object carries the object, or a case where the object is mounted on a load placed on the mobile object.

2. First Embodiment (1) Configuration of Radio Wave Map Providing Device

Figure 2:
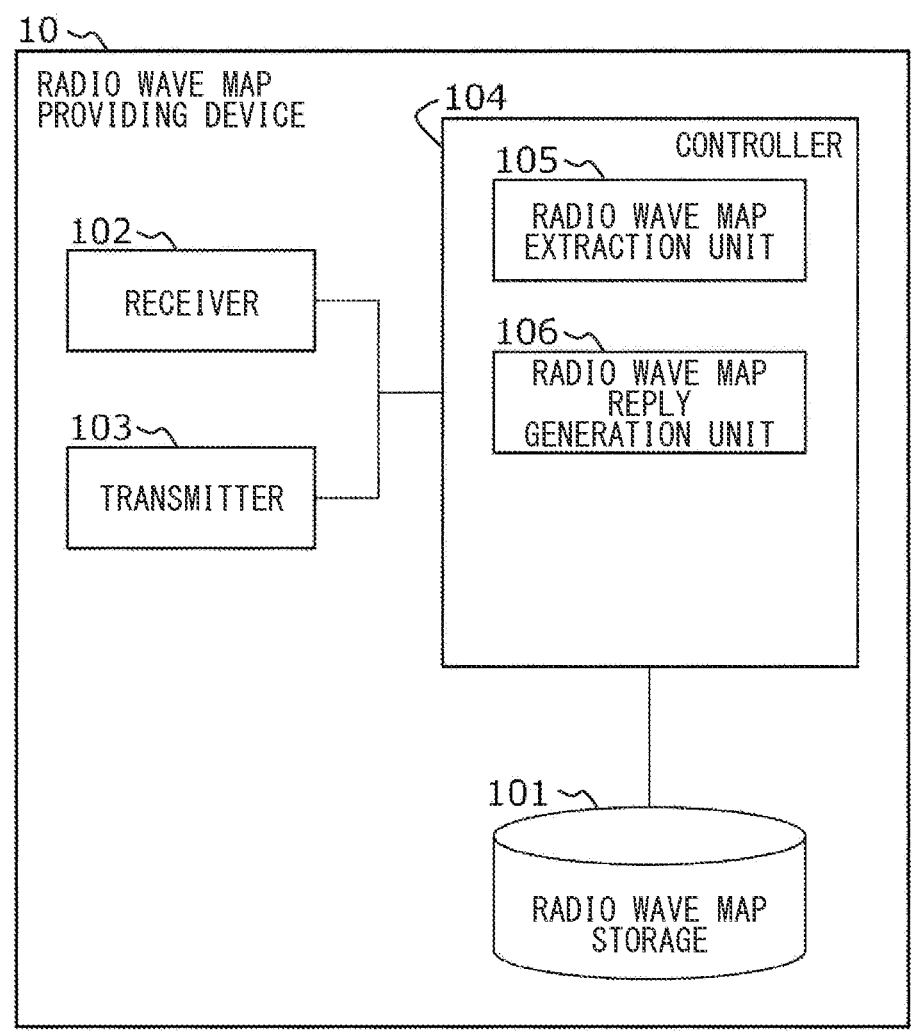
FIG. 2 is a block diagram showing a configuration example of a radio wave map providing device according to a first embodiment.

A configuration of a radio wave map providing device 10 according to the first embodiment will be described with reference to FIG. 2.

The radio wave map providing device 10 includes a radio wave map storage 101, a receiver 102, a transmitter 103, and a controller 104. The controller 104 implements a radio wave map extraction unit 105 and a radio wave map reply generation unit 106 by itself, and controls operations of the radio wave map storage 101, the receiver 102, and the transmitter 103.

The radio wave map providing device 10 may include a general-purpose central processing unit (CPU), a volatile memory such as a RAM, a non-volatile memory such as a ROM, a flash memory, or a hard disk, various interfaces, and an internal bus connecting the constituents to each other. Then, by executing software on these hardware, the radio wave map providing device 10 is configured to perform the functions of each functional block described in FIG. 2. Of course, the radio wave map providing device 10 may be implemented by dedicated hardware such as LSI. The similar applies to a radio wave map providing device according to second and subsequent embodiments.

As the radio wave map providing device 10, a form of an electronic control device (electronic control unit (hereinafter abbreviated to ECU)) as a semifinished product in the present embodiment is supposed, but the present disclosure is not limited thereto. For example, a form of a component may be a semiconductor circuit or a semiconductor module, and a form of a finished product may be a personal computer (PC), a smartphone, a cellular phone, or a navigation system. The radio wave map providing device 10 may be configured with multiple ECUs instead of a single ECU. For example, a communication ECU may perform communication with the outside.

The radio wave map storage 101 is a storage that stores a radio wave map, and is implemented by a volatile memory such as a RAM as well as a nonvolatile memory such as a flash memory or a hard disk. Also, a removable storage medium such as a BD, DVD, or SD card may be used. The radio wave map stored in the radio wave map storage 101 has reference position information indicating a reference position and reference communication quality information indicating communication quality at the reference position. Here, the communication quality indicated by the reference communication quality information is, for example, the average bit rate per unit time (bps) or RSSI.

The receiver 102 receives the radio wave map request transmitted from the radio wave map acquisition-utilization device 200. The radio wave map request includes, for example, current position information indicating the current position of the vehicle, "movement section information" indicating a movement schedule section in which the vehicle is scheduled to move in the future, and request communication quality information indicating the communication quality requested by the radio wave map acquisition-utilization device 200. For example, in the case of the present embodiment, the following information is received as the radio wave map request.

(Radio Wave Map Request)

Current position information is an ID representing a latitude, longitude and altitude of the current position of the vehicle or a grid point on the map. Movement section information is multiple coordinate information indicating the movement schedule section of the vehicle. Request communication quality information is requested communication speed [Mbps].

Here, the "movement section information" may be any information indicating a certain range in which the mobile object is scheduled to move. For example, the movement section information may be information indicating multiple continuous points, information indicating two points (a start point and an end point), or information of combination of one point (start point or end point of a section) and length.

The radio wave map request may include information other than those described above. For example, when the radio wave map acquisition-utilization device 200 only needs a radio wave map for a part of the movement schedule section, the radio wave map request further includes request section information indicating the section according to the requested radio wave map. Further, the movement section information may indicate a part of the travel route along which the vehicle is scheduled to move, such as every 10 m or every 100 m.

The radio wave map extraction unit 105 acquires, from the radio wave map storage 101, the reference position information indicating a reference position included in the movement schedule section of the vehicle and the reference communication quality information.

The radio wave map reply generation unit 106 "compares", in the reference communication quality information acquired by the radio wave map extraction unit 105, the information amount of the reference communication quality information "equal to or greater than" the request communication quality information with the information amount of the reference communication quality information "equal to or less than" the request communication quality information. As a result of the comparison, the radio wave map reply is generated "based on" the reference communication quality information with a small amount of information and the reference position information corresponding to the reference communication quality information with a small amount of information. Hereinafter, among the reference communication quality information acquired by the radio wave map extraction unit 105, the reference communication quality information having a small amount of information may be also referred to as "provision reference communication quality information". Further, the reference position information corresponding to the "provision reference communication quality information" may be also referred to as "provision reference position information".

Here, the expression of "equal to or greater than" and the expression of" equal to less than" may include both of a case in which the same value as the "request communication quality information" to be compared is included and a case in which it is not included. The expression of "comparison" may mean directly comparing the information amount of the reference communication quality information, and may mean indirectly comparing the information amount of the reference communication quality information by comparing other items. The expression of "generating based on" may mean generating the provision reference position information and the provision reference communication quality information as the radio wave map reply as they are, or may mean generating the radio wave map reply by using a part of the provision reference position information and the provision reference communication quality information or performing calculation on the information.

The radio wave map reply generation unit 106 may compare the information amount of the reference communication quality information by, for example, comparing a section of a reference position indicated by the reference position information corresponding to the reference communication quality information equal to or greater than the request communication quality with a section of the reference position indicated by the reference position information corresponding to the reference communication quality information equal to or less than the request communication quality information. When the granularity of the radio wave map stored in the radio wave map storage 101 is constant regardless of the position, the narrower the section of the reference position, the smaller the information amount of the reference communication quality information. Therefore, it is possible to indirectly compare the information amount of the reference communication quality information by comparing distances of the sections of the reference position. However, when the granularity of the radio wave map stored in the radio wave map storage 101 differs depending on the position, the distance of the section of the reference position may not be proportional to the information amount of the reference communication quality information. In such a case, it is desirable to directly compare the information amount of the reference communication quality information.

Figure 3:
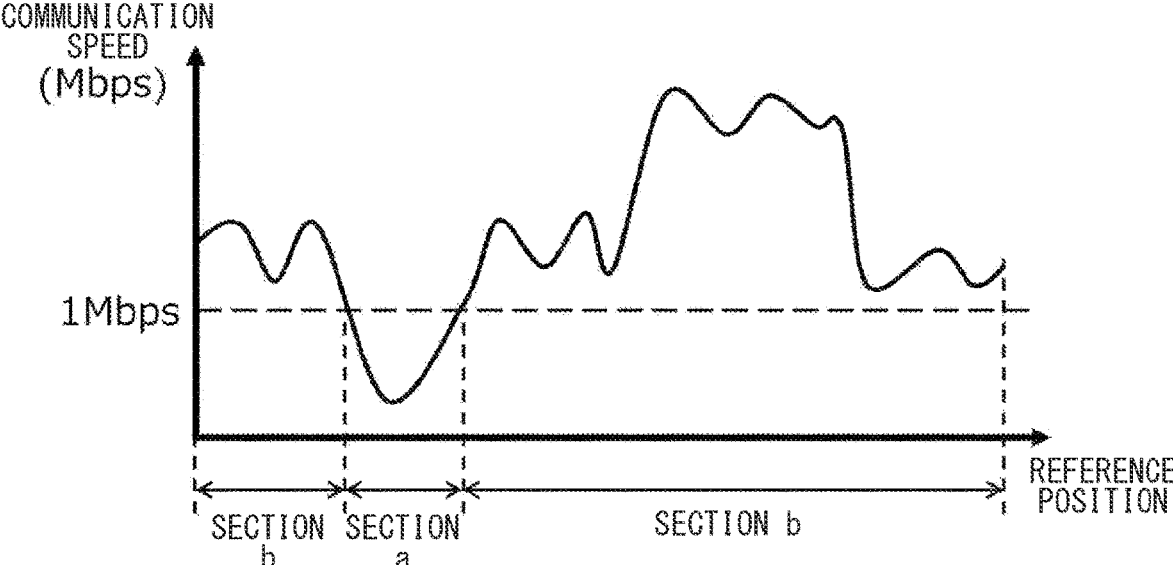
FIG. 3 is a diagram illustrating reference position information and reference communication quality information included in a radio wave map reply of the present disclosure.

FIG. 3 is a graph showing the relationship between the reference position included in the movement schedule section and the communication speed [Mbps], which is the reference communication quality information at the reference position. Here, an example in which the request communication quality information is 1 Mbps will be described. Further, in FIG. 3, the granularity of the information of the radio wave map is constant regardless of the position.

A section a in FIG. 3 is a section in which the communication speed, which is the reference communication quality information, is 1 Mbps or less, and a section b is a section in which the communication speed is 1 Mbps or higher. As shown in FIG. 3, the section a is narrower than the section b. Therefore, as a result of comparison of the information amount of the reference communication quality information of the section a with the information amount of the reference communication quality information of the section b, the information amount of the radio wave map of the section a quantity is smaller. Therefore, the radio wave map reply generation unit 106 sets the reference position information indicating the reference position included in the section a as the provision reference position information, and sets the reference communication quality information in the section a as the provision reference communication quality information, and generates the radio wave map reply including these.

The radio wave map reply may be generated "based on" the provision reference position information and the provision reference communication quality information, and may not include the provision reference position information and the provision reference communication quality information as they are. For example, the radio wave map reply generation unit 106 may calculate an average value of the provision reference communication quality information, and generate a radio wave map reply including the calculated average value. Alternatively, the radio wave map reply generation unit 106 may generate a radio wave map reply including only part of the provision reference position information and the provision reference communication quality information. For example, in a case of the example of FIG. 3, the radio wave map reply generation unit 106 may generate a radio wave map reply including provision reference position information indicating the start point of the section a, provision reference position information indicating the end point of the section a, and provision reference communication quality information indicating the minimum communication speed in the section a.

The radio wave map reply generation unit 106 may further adjust the granularity of the information included in the radio wave map reply according to the movement speed at which the vehicle travels in the movement schedule section. For example, when the movement speed of the vehicle is slow, a time during traveling of the vehicle in the movement schedule section is long, and there are many opportunities for communication within the movement schedule section. Therefore, it is desirable to perform communication control using a radio wave map with a small granularity, that is, a more detailed map. On the other hand, when the movement speed of the vehicle is high, a time during the traveling of the vehicle in the movement schedule section is short, so there is a high possibility that the radio wave map with the small granularity is not necessary. Therefore, a radio wave map reply is generated in which the granularity of the provision reference position information and the provision reference communication quality information becomes larger as the movement speed of the vehicle in the movement schedule section increases. For example, when the movement speed of the vehicle is 10 km/h, a radio wave map reply including the provision reference position information and the provision reference communication quality information every 1 m is generated. When the movement speed of the vehicle is 60 km/h, a radio wave map reply including the provision reference position information and the provision reference communication quality information every 10 m is generated. The movement speed of the vehicle and the granularity of information included in the radio wave map reply may not have a proportional relationship. For example, a reference value of the movement speed may be set in advance. When the movement speed is equal to or higher than the reference value, a radio wave map reply of a first granularity may be generated. When the movement speed is equal to or lower than the reference value, a second granularity smaller than the first granularity may be generated.

When the radio wave map reply generation unit 106 adjusts the granularity of information included in the radio wave map reply, the radio wave map reply generation unit 106 may acquire the movement speed of the vehicle included in the radio wave map request. Alternatively, the radio wave map reply generation unit 106 may estimate the movement speed of the vehicle based on a legal speed in the movement schedule section and the degree of road congestion in the section, and adjust the granularity using the estimated movement speed.

The transmitter 103 transmits the radio wave map reply generated by the radio wave map reply generation unit 106 to the radio wave map acquisition-utilization device 200.

For example, in the case of the present embodiment, the following information is transmitted as the radio wave map reply.

(Radio Wave Map Reply)

Timestamp is a time point when the radio wave map included in the radio wave map reply is generated. Provision reference position information is an ID representing the latitude, longitude, and altitude of the reference position or a grid point on the map. Provision reference communication quality information is a communication speed at the reference position [Mbps].

The radio wave map acquisition-utilization device 200 uses the received radio wave map reply to perform transmission control when transmitting various data acquired at the vehicle. For example, when receiving the radio wave map reply including the provision reference position information and the provision reference communication quality information corresponding to the section a in FIG. 3, the radio wave map acquisition-utilization device 200 can determine that the requested communication quality cannot be obtained in the section a, and further determine that the requested communication quality can be obtained in sections other than the section a. Therefore, for example, communication scheduling is performed so that data with a small capacity is transmitted in the section a, and data with a large capacity such as image data is transmitted in sections other than the section a.

(2) Operation of Radio Wave Map Providing Device 10

Figure 4:
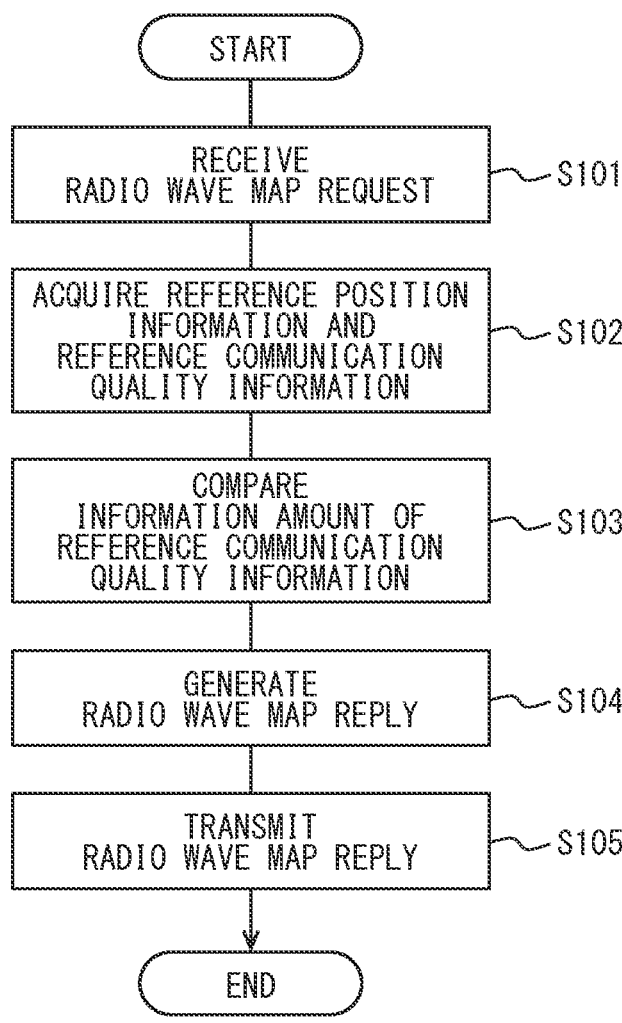
FIG. 4 is a flowchart showing an operation of the radio wave map providing device according to the first embodiment.

The operation of the radio wave map providing device 10 of the present embodiment will be described with reference to FIG. 4. The following operations not only show the radio wave map providing method executed by the radio wave map providing device 10, but also show a processing procedure of the radio wave map providing program that can be executed by the radio wave map providing device 10. The order of these processes is not limited to the order shown in FIG. 4. That is, the order may be changed as long as there are no restrictions such as restrictions that a relationship in which a result of the preceding process is used in a certain process. The similar applies to the operation of the radio wave map providing device according to the second and subsequent embodiments.

The receiver 102 receives a radio wave map request including the current position information, movement section information, and request communication quality information from the radio wave map acquisition-utilization device 200 (S101). The radio wave map extraction unit 105 acquires, from the radio wave map storage 101, the reference position information included in the movement schedule section and the reference communication quality information corresponding to the reference position information (S102). The radio wave map reply generation unit 106 "compares", in the reference communication quality information acquired in S102, the information amount of the reference communication quality information equal to or greater than the request communication quality information with the information amount of the reference communication quality information equal to or less than the request communication quality information (S103). As a result of the comparison in S103, the radio wave map reply generation unit 106 generates the radio wave map reply based on "the reference communication quality information with a small amount of information and the reference position information corresponding to the reference communication quality information (S104). The transmitter 103 transmits the radio wave map reply generated in S104 to the radio wave map acquisition-utilization device 200 (S105).

As described above, according to the radio wave map providing device of the present embodiment, the radio wave map reply is generated based on the information having the communication quality equal to, higher than, or lower than the communication quality requested by the radio wave map acquisition-utilization device and the position information, is transmitted to the radio wave map acquisition-utilization device Thereby, it is possible to reduce the amount of communication between the radio wave map providing device and the radio wave map acquisition-utilization device while providing necessary information for the radio wave map acquisition-utilization device to control data transmission.

3. Second Embodiment

In the present embodiment, a configuration capable of further reducing the amount of data transmitted and received between the radio wave map providing device and the radio wave map acquisition-utilization device will be described.

(1) Configuration of Radio Wave Map Providing Device

Figure 5:
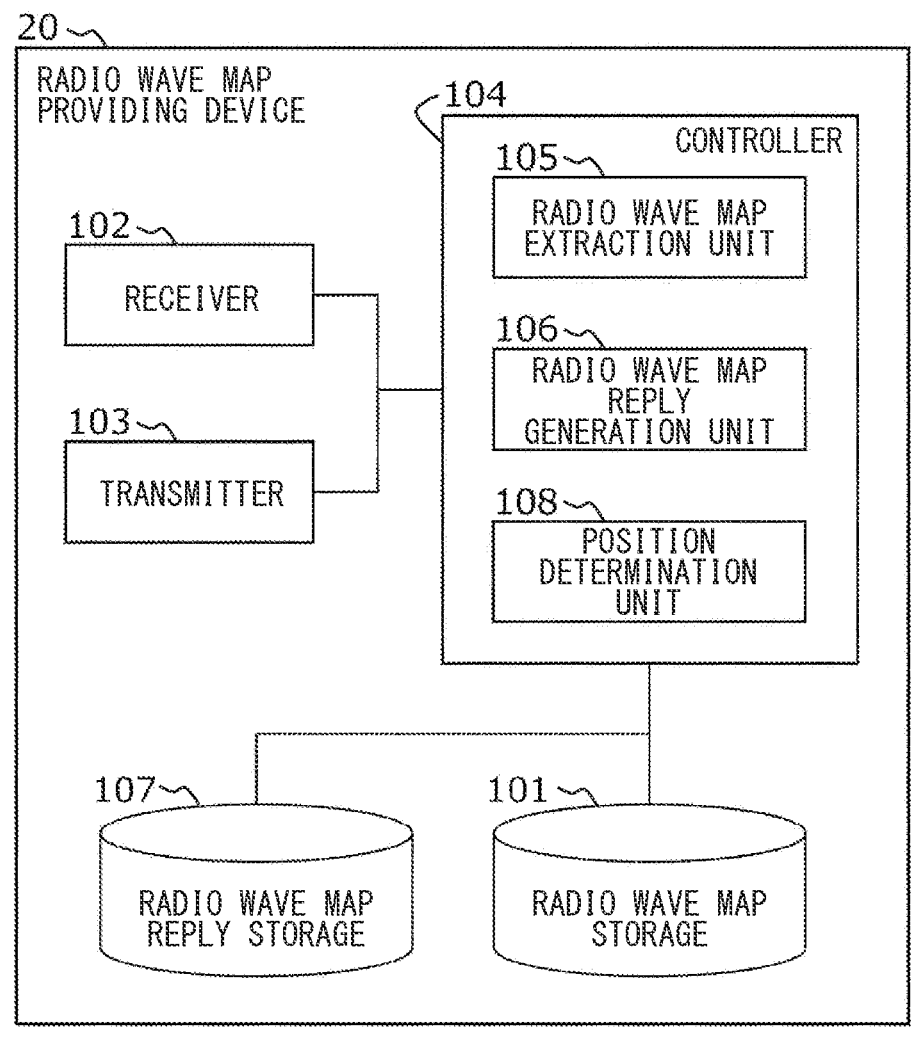
FIG. 5 is a block diagram showing a configuration example of a radio wave map providing device according to a second embodiment.

FIG. 5 shows a radio wave map providing device 20 of the present embodiment. The radio wave map providing device 20 includes a radio wave map reply storage 107 and a position determination unit 108 in addition to the components of the radio wave map providing device 10 shown in FIG. 2.

The radio wave map reply generation unit 106 of the present embodiment generates two radio wave map replies (hereinafter referred to as a first radio wave map reply and a second radio wave map reply). The first radio wave map reply is a radio wave map reply that includes the provision reference position information among the information acquired by the radio wave map extraction unit 105, and does not include the provision reference communication quality information. On the other hand, the second radio wave map reply includes both the provision reference position information and the provision reference communication quality information.

The radio wave map reply generation unit 106 does not necessarily have to generate the first radio wave map reply. When the position determination unit 108 described later determines that an interval from the current position indicated by the current position information of the vehicle in the radio wave map request to a reference position indicated by the provision reference position information is equal to or less than a predetermined threshold, the radio wave map reply generation unit 106 may not generate the first radio wave map reply and may generate on the second radio wave map reply.

The radio wave map reply storage 107 temporarily stores the radio wave map reply until the radio wave map reply generated by the radio wave map reply generation unit 106 is transmitted from the transmitter 103 to the radio wave map acquisition-utilization device 200. The radio wave map reply storage 107 may be implemented by a volatile memory such as a RAM as well as a non-volatile memory such as a flash memory or a hard disk.

The position determination unit 108 determines whether the "interval" from the current position of the vehicle indicated by the current position information to the reference position indicated by the provision reference position information is equal to or greater than a predetermined threshold. Here, the reference position indicated by the provision reference position information may be, for example, a reference position indicating the start point or end point of the section a shown in FIG. 3, or a reference position indicating the center of the section a.

The transmitter 103 transmits the first radio wave map reply or the second radio wave map reply based on the determination result of the position determination unit 108. As a result of determination by the position determination unit 108, the transmitter 103 transmits the first radio wave map reply when the "distance" from the current position of the vehicle to the reference position indicated by the provision reference position information is equal to or greater than a predetermined threshold. On the other hand, when the "distance" from the current position of the vehicle to the reference position indicated by the provision reference position information is equal to or less than the predetermined threshold, the transmitter 103 transmits the second radio wave map reply.

Here, the "distance" includes the position indicated by the current position information, the position and distance indicated by the provision reference position information, and also the necessary time from the position indicated by the current position information to the position indicated by the provision reference position information.

For example, when the distance from the current position of the vehicle to the reference position indicated by the provision reference position information is longer than a preset distance threshold, the first radio wave map reply is transmitted. Alternatively, instead of the distance, the time required for the vehicle to reach, from the current position, the reference position indicated by the provision reference position information may be estimated. When the estimated time is longer than a preset time threshold, the first radio wave map reply may be transmitted.

It is desirable that, after the transmitter 103 transmits the first radio wave map reply, the receiver 102 of the present embodiment receives, from the radio wave map acquisition-utilization device 200, the position information (corresponding to "second current position information") indicating the current position of the vehicle is received periodically. This position is the new current position (corresponding to the "second current position") of the vehicle that has moved from the current position (corresponding to the "first current position") indicated by the current position information in the radio wave map request.

In this case, when the receiver 102 receives the current position information of the vehicle after movement, the position determination unit 108 determines whether the "interval" between the position indicated by the current position information after the movement and the reference position indicated by the provision reference position information is equal to or greater than a predetermined threshold. Then, when the interval between the current position after movement and the reference position becomes equal to or less than the predetermined threshold, the transmitter 103 transmits the second radio wave map reply.

The receiver 102 of the present embodiment may receive change information indicating that the movement schedule section of the vehicle has been changed, in addition to the radio wave map request and the current position information after the vehicle has moved. The travel route of the vehicle may change depending on the occupants and road conditions. In that case, since the movement schedule section changes along with the change of the travel route of the vehicle, there is a high possibility that the information in the radio wave map reply generated based on the movement schedule section before the travel route was changed will not be used. Therefore, when there is a change in the movement schedule section of the vehicle, the radio wave map acquisition-utilization device 200 transmits change information to the radio wave map providing device 20.

When the receiver 102 receives the change information from the radio wave map acquisition-utilization device 200, it is unnecessary to transmit the second radio wave map reply. Therefore, the second radio wave map reply stored in the radio wave map reply storage 107 is deleted.

Thereby, it is possible to prevent transmission and reception of the radio wave map reply including the radio wave map that is unnecessary due to the change of the travel route, and execution of the unnecessary communication between the radio wave map providing device 20 and the radio wave map acquisition-utilization device 200.

(2) Operation of Radio Wave Map Providing Device

Figure 6:
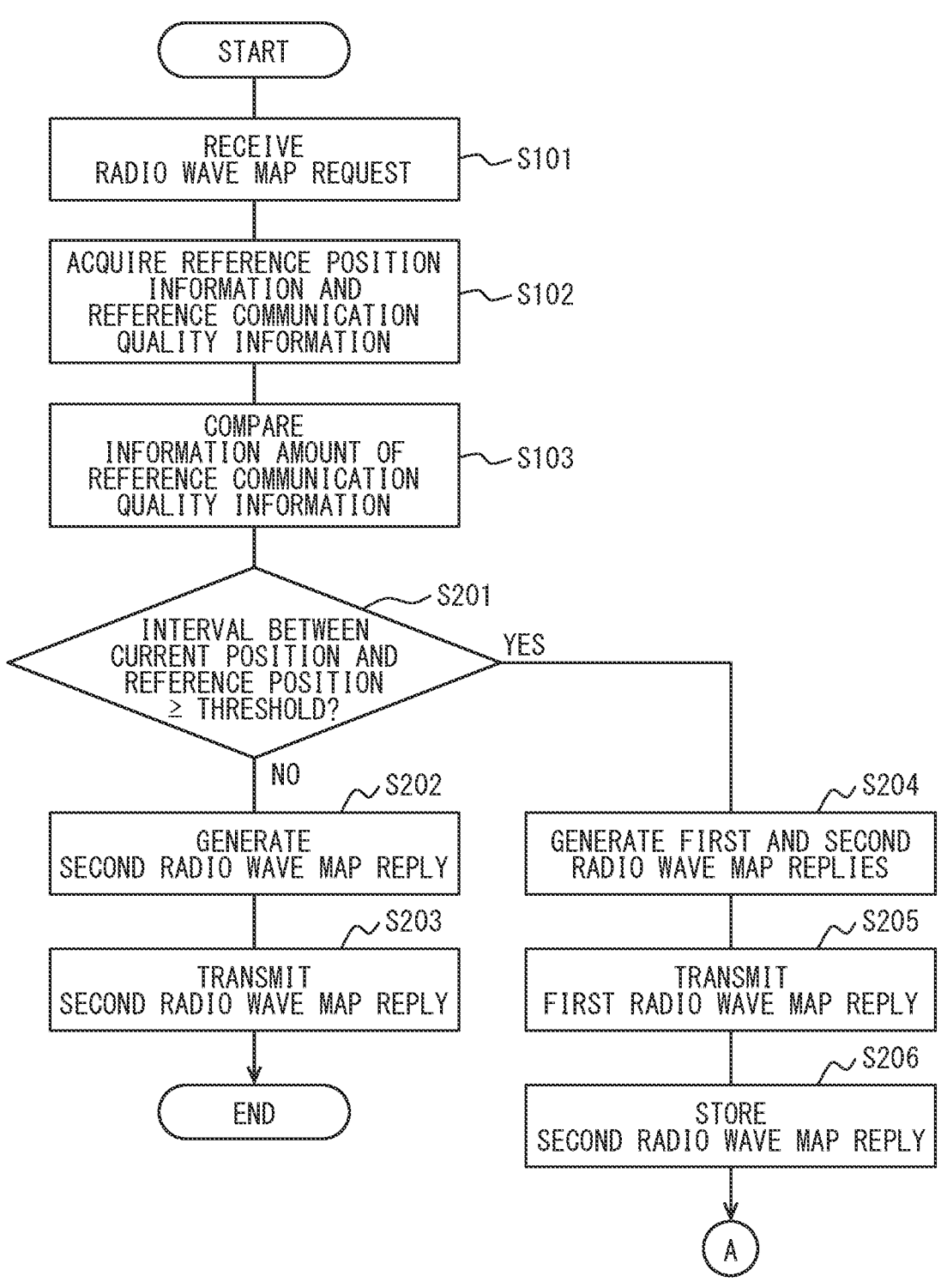
FIG. 6 is a flowchart showing an operation of the radio wave map providing device according to the second embodiment.

The operation of the radio wave map providing device 20 of the present embodiment will be described with reference to FIGS. 6 and 7. The descriptions of the same processes as those in FIG. 4 will be omitted.

The position determination unit 108 determines whether the interval from the current position of the vehicle indicated by the current position information to the reference position indicated by the provision reference position information is equal to or greater than a predetermined threshold (S201). When the determination result of S201 is equal to or less than the predetermined threshold (S201: No), the radio wave map reply generation unit 106 generates the second radio wave map reply (S202).

The transmitter 103 transmits the second radio wave map reply generated in S202 (S203).

When the determination result of S201 is equal to or greater than the predetermined threshold (S201: Yes), the radio wave map reply generation unit 106 generates the first radio wave map reply and the second radio wave map reply (S204). The transmitter 103 transmits the first radio wave map reply generated in S204 to the radio wave map acquisition-utilization device 200 (S205). The radio wave map reply storage 107 stores the second radio map reply generated in S204 (S206).

Figure 7:
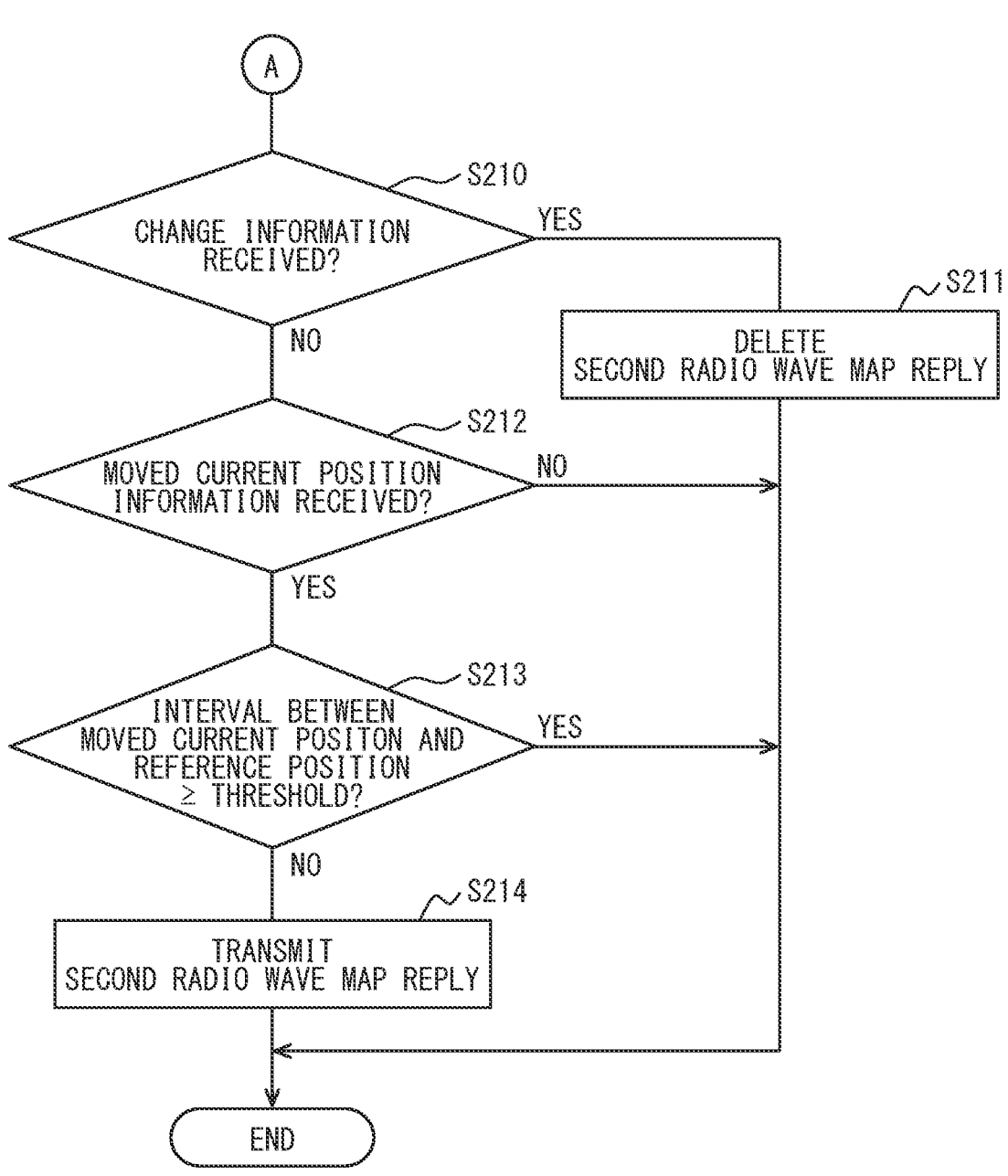
FIG. 7 is a flowchart showing an operation of the radio wave map providing device according to the second embodiment.

FIG. 7 shows processes that are periodically performed after the process of S206.

It is determined whether the receiver 102 has received change information (S210).

When the change information has been received (S210: Yes), the second radio wave map reply stored in the radio wave map reply storage 107 is deleted (S211).

On the other hand, when the change information has not been received (S210: No), it is determined whether the current position information of the vehicle after movement has been received from the radio wave map acquisition-utilization device 200 (S212). When the current position information of the vehicle after movement has been received (S212: Yes), the position determination unit 108 determines whether the interval between the current position indicated by the current position information of the vehicle after movement and the reference position indicated by the provision reference position information is equal to or greater than the predetermined threshold (S213). When the determination result in S213 is equal to or less than the predetermined threshold (S213: No), the second radio wave map reply stored in the radio wave map reply storage 107 is transmitted (S214).

According to the present embodiment, when the vehicle approaches the reference position indicated by the provision reference position information, the radio wave map acquisition-utilization device 200 can receive the second radio wave map reply transmitted from the radio wave map providing device 20, and acquire the provision reference communication quality information. However, when the second radio wave map reply has not been received even though the vehicle approaches the reference position indicated by the provision reference position information, the radio wave map acquisition-utilization device 200 may transmit the radio wave map request again.

When the reference position indicated by the provision reference position information included in the radio wave map reply is far from the current position of the vehicle, the travel route may change before the vehicle reaches the reference position. When the travel route is changed, the radio wave map reply information corresponding to the original travel route is not used. Therefore, when the current position of the vehicle is far from the reference position, there is a possibility that the information of the radio wave map reply that is transmitted and received may become unnecessary. Further, the communication of the unnecessary radio wave map reply is performed. Therefore, in the present embodiment, when the current position of the vehicle is far from the reference position, a radio wave map reply including only the position information is transmitted. When the current position of the vehicle becomes close to the provision reference position, the communication quality information is transmitted. In this way, it is possible to minimize unnecessary data communication by transmitting the radio wave map reply in stages according to the interval between the current position of the vehicle and the reference position.

4. Modification

In the present description, a modification in which the radio wave map reply is generated by the radio wave map reply generation unit 106 and provided to the radio wave map acquisition-utilization device 200 will be described. Although the following modification can be applied to both first and second embodiments, an example applied to the first embodiment will be described.

(1) First Modification

In the present modification, a configuration will be described in which a section having a certain range and communication quality information as a representative value in the section are transmitted as the radio wave map reply.

Figure 8:
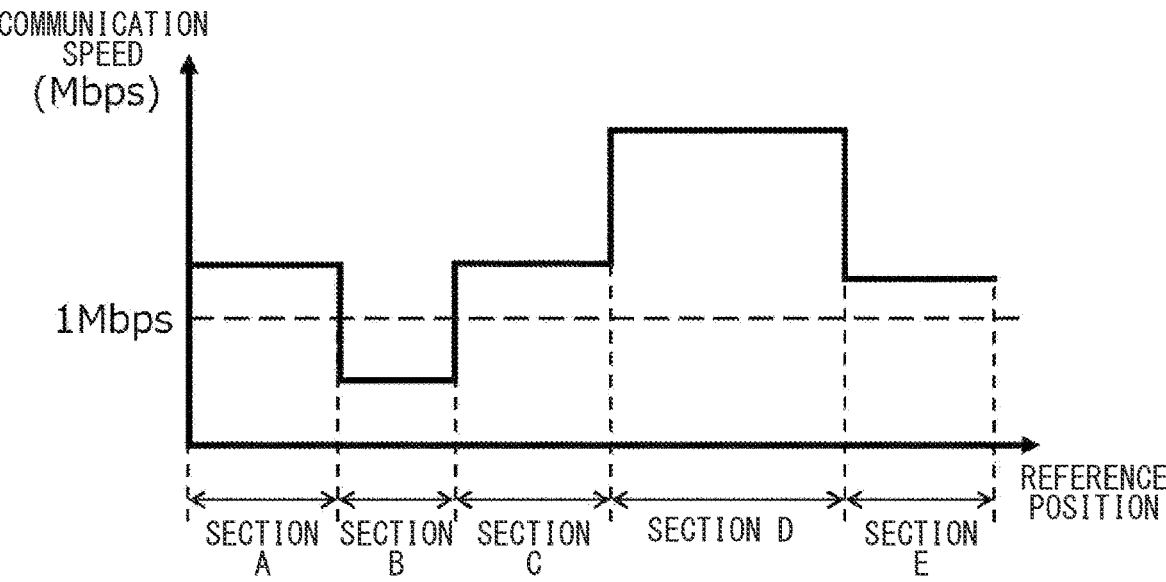
FIG. 8 is a diagram illustrating the reference position information and the reference communication quality information included in the radio wave map reply according to a first modification of the first embodiment and the second embodiment.

FIG. 8 is a diagram showing the relationship between the reference position information and the communication speed [Mbps], which is the reference communication quality information, in the present modification. As in FIG. 3, the request communication quality information is 1 Mbps. Unlike FIG. 3, in the radio wave map shown in FIG. 8. each reference position is divided into multiple sections in advance, and the reference position information indicates the sections. Further, the reference communication quality information indicates a representative value of the communication quality in each section. This section is a section from a specific reference position (corresponding to "first reference position") to another reference position (corresponding to "second reference position").

In the example of FIG. 3, the sections having the information equal to, greater than, or less than the request communication quality information are defined as sections a and b, respectively. However, the present modification differs from FIG. 3 in that the reference position is divided into multiple sections in advance regardless of the request communication quality information. This sections are divided, for example, at points where the rate of change between the communication quality at the reference position and the communication quality at the adjacent reference position is greater than a predetermined change rate set in advance. Alternatively, the section may be divided at points where a base station connected by wireless communication between the radio wave map providing device 10 and the radio wave map acquisition-utilization device 200 changes.

In the example shown in FIG. 8, sections A, C, D, and E have reference communication quality information equal to or higher than the request communication quality information, and only a section B has reference communication quality information equal to or lower than the request communication quality information. Therefore, the information amount of the reference communication quality information in the section B is smaller than the information amount of the reference communication quality information in the sections A, C, D, and E.

Therefore, the radio wave map reply generation unit 106 of the present embodiment generates the radio wave map reply including reference communication quality information with a small amount of information, that is, reference communication quality information indicating a representative value of communication quality in the section B and reference position information indicating the section B.

The radio wave map storage 101 may store a radio map having reference position information indicating sections and reference communication quality information representing a representative value of communication quality in each section. However, as in the first and second embodiments, the radio wave map storage 101 stores reference position information indicating each reference position and communication quality information indicating the communication quality at the reference position. The movement schedule section may be divided into multiple sections when the movement section information included in the radio wave map request is received. In this case, the reference position is divided into multiple sections according to the sections into which the movement schedule section is divided, and the representative value of the communication quality of each section is calculated. When the movement section information is divided into multiple sections, for example, as described above, the movement section information is divided into multiple sections according to the rate of change in communication quality and the connected base station.

As described above, in the present modification, instead of a plurality of pieces of reference position information and reference communication quality information, the radio wave map reply including the reference position information indicating a section and the reference communication quality information representing a representative value of communication quality information for the section is transmitted to the radio wave map acquisition-utilization device 200. Thereby, it is possible to significantly reduce the amount of communication between the radio wave map providing device 10 and the radio wave map acquisition-utilization device 200.

(2) Second Modification

In the present modification, instead of the reference position information, a configuration will be described in which the schedule time point at which the vehicle travels at the reference position is transmitted as the radio wave map reply.

The radio wave map reply generation unit 106 according to the modification calculates the schedule time point at which the vehicle moves to the reference position indicated by the reference position information acquired by the radio wave map extraction unit 105. The radio wave map reply generation unit 106 may, for example, calculate the schedule time point at which the vehicle moves from the reference position based on the vehicle movement speed included in the radio wave map request or the legal speed in the movement schedule section.

Then, the radio wave map reply generation unit 106 generates a radio wave map reply including schedule time point information indicating the calculated schedule time point and reference communication quality information indicating communication quality at the scheduled time point.

When receiving the radio wave map reply including the reference position information and the reference communication quality information, the radio wave map acquisition-utilization device 200 calculates the time point at which the vehicle travels at the reference position, and schedules communication based on the calculated time point. Therefore, instead of the radio wave map acquisition-utilization device 200, the radio wave map providing device 10 calculates the schedule time point at which the vehicle travels at the reference position, and transmits a radio wave map reply including the schedule time point information and the reference communication quality information. Thereby, since a conversion process from the position information to the time point information by the radio wave map acquisition-utilization device 200 becomes unnecessary, it is possible to reduce the process load of the radio wave map acquisition-utilization device 200.

(3) Third Modification

In the present modification, a configuration will be described in which, instead of the reference position information and the reference communication quality information, an instruction for acquiring the information from another vehicle is transmitted as the radio wave map reply.

As in the first embodiment, the radio wave map reply generation unit 106 according to the present modification, compares, in the reference communication quality information acquired by the radio wave map extraction unit 105, the information amount of the reference communication quality information equal to or greater than the request communication quality information with the information amount of the reference communication quality information equal to or less than the request communication quality information. Here, in the first embodiment, the radio wave map reply is generated based on the provision reference communication quality information, which is the reference communication quality information with a small amount of information, and the provision reference position information corresponding to the reference communication quality information. However, the radio wave map reply generation unit 106 according to the present modification further generates a radio wave map reply in the past based on the same information as the provision reference communication quality information and the provision reference position information extracted this time, and determines whether the transmitter 103 transmits the radio wave map reply to another vehicle (corresponding to a "second mobile object").

When it is determined that the transmitter 103 has not transmitted the same radio wave map reply in the past, the radio wave map reply generation unit 106 generates the radio wave map reply (corresponding to "first radio wave map reply") based on the provision reference communication quality information and the provision reference position information.

On the other hand, when the transmitter 103 determines that the same radio wave map reply has been transmitted in the past, the radio wave map reply generation unit 106 generates a radio wave map reply (corresponding to "second radio wave map reply") for acquisition instruction of the radio wave map reply from the vehicle that is the transmission destination of the radio wave map reply. This radio wave map reply may include identification information indicating a device or a vehicle to which the transmitter 103 has transmitted the radio wave map reply in the past.

As described above, in the present modification, when the radio wave map providing device 10 has already transmitted the information required by the radio wave map acquisition-utilization device 200 to another device, the radio wave map providing device 10 transmits the radio wave map reply for instruction of the acquisition of the radio wave map reply from another device. When another device has the radio wave map reply information required by the radio wave map acquisition-utilization device 200, the radio wave map acquisition-utilization device 200 receives the radio wave map reply via, for example, the vehicle-to-vehicle communication or Wi-Fi. Thereby, it is possible to reduce the communication cost.

(4) Fourth Modification

In the present modification, a configuration will be described in which a delay time limit is set for data to be transmitted by the radio wave map acquisition-utilization device 200.

When a delay time limit is set for the data to be transmitted from the radio wave map acquisition-utilization device 200, it is necessary to complete the data transmission within the delay time limit. However, when the section in which the vehicle is scheduled to move within the delay time limit, a section with the radio wave map reference communication quality equal to or higher than the request communication quality is short, there is a risk that data transmission will not be completed within the delay time limit.

Therefore, in the present modification, based on the amount of data to be transmitted from the radio wave map acquisition-utilization device 200 and the delay time limit set for the data to be transmitted, the radio wave map providing device 10 determines whether the data transmission can be completed in the section with the radio wave map reference communication quality equal to or higher than the request communication quality in the movement schedule section where the vehicle moves in the delay time limit. Then, upon determining that the data transmission is not completed within the section with the reference communication quality equal to or higher than the request communication quality, the radio wave map providing device 10 divides the movement schedule section into a section where the radio wave map acquisition-utilization device 200 transmits the data and a section where the radio wave map acquisition-utilization device 200 does not transmit the data so that the data transmission is completed with the delay time limit.

Figure 9:
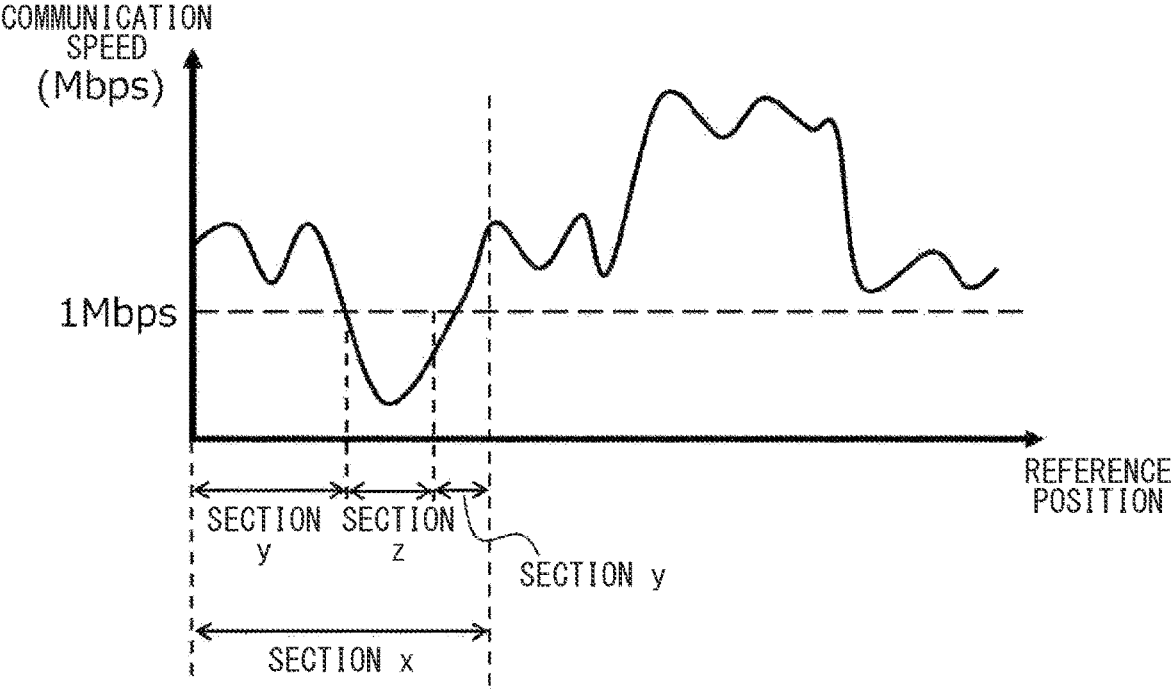
FIG. 9 is a diagram illustrating the reference position information and the reference communication quality information included in the radio wave map reply according to a fourth modification of the first embodiment and the second embodiment.

FIG. 9 is a diagram showing the relationship between the reference position information and the communication speed [Mbps], which is the reference communication quality information, in the present modification. As in FIG. 3, the request communication quality information is 1 Mbps. Also, a section x indicates a section where the vehicle moves by the delay time limit. Within the section x, a section with a reference communication quality information equal to or less than the request communication quality information is shorter than the section with the reference communication quality information equal to or greater than the request communication quality information. Therefore, according to the configuration of the first embodiment described above, the radio wave map reply including, as the provision reference communication quality information, the reference communication quality information equal to or lower than the required communication quality is generated as the radio wave map reply.

However, in the section with the reference communication quality information equal to or higher than the request communication quality, transmission of data scheduled to be transmitted may not be completed. Therefore, the radio wave map providing device 10 according to the present modification divides the movement schedule section (section x) where the vehicle moves within the delay time limit into a section y where the radio wave map acquisition-utilization device 200 executes data transmission and a section z where the radio wave map acquisition-utilization device 200 does not execute the data transmission. Here, the section y is provided so as to be a section where the entire data to be transmitted can be transmitted. As shown in FIG. 9, the section y also includes a section with the reference communication quality information equal to or less than the request communication quality information.

Then, the radio wave map reply generation unit 106 according to the present modification compares the information amount of the reference communication quality information in the section y and the information amount of the reference communication quality information in the section z, and generates the radio wave map reply based on the reference communication quality information with the small data amount and the reference position information corresponding to the reference communication quality information with the small data amount.

According to the present modification, the radio wave map providing device 10 can reduce the amount of communication between the radio wave map providing device and the radio wave map acquisition-utilization device while providing the radio map information necessary for the radio wave map acquisition-utilization device 200 to transmit data within the delay time limit.

5. General Overview

The features of the radio wave map providing device according to each embodiment of the present disclosure have been described above.

Since the terms used in each embodiment are examples, the terms may be replaced with terms that are synonymous or include synonymous functions.

The block diagrams used for the description of the embodiments are obtained by classifying and arranging the configurations of the device for each function. The blocks representing the respective functions may be implemented by any combination of hardware or software. Further, since the block diagrams illustrate the functions, the block diagrams can be understood as disclosure of the method and the program that implements the method.

Functional blocks that can be understood as processes, flows, and methods described in the respective embodiments may be changed in order as long as there are no restrictions such as a relationship in which results of preceding other process are used in one process.

The terms of first, second, and N-th (N is an integer) used in each embodiment and the claims are used to distinguish two or more configurations of the same type and two or more methods of the same type and do not limit the order and superiority and inferiority.

The radio wave map providing device of each embodiment is premised on providing the radio wave map to the radio wave map acquisition-utilization device mounted on the vehicle. However, in the present disclosure, the radio wave map may be provided to any device that utilizes the radio wave map, except as specifically limited in the claims.

Further, examples of forms of the device of the present disclosure include the following. Examples of a form of a component include a semiconductor element, an electronic circuit, a module, and a microcomputer. Examples of a form of a semifinished product include an electronic control device (electronic control unit (ECU)) and a system board. Examples of a form of a finished product include a cellular phone, a smartphone, a tablet computer, a personal computer (PC), a workstation, and a server. The devices may include a device having a communication function and the like, and include, for example, a video camera, a still camera, and a car navigation system.

Each device may additionally include necessary functions such as an antenna and a communication interface.

The radio wave map providing device of the present disclosure is assumed to be used for the purpose of providing various services. In conjunction with providing such services, the device of the present disclosure may be used, the method of the present disclosure may be used, or/and the program of the present disclosure may be executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via the recording medium or from a server via a communication line without using the recording medium. As a result, it is possible to always provide a latest function by updating the program.

INDUSTRIAL APPLICABILITY

The radio wave map providing device of the present disclosure has been described as the server device that provides the radio wave map to the radio wave map acquisition-utilization device which is an in-vehicle device. However, the radio wave map providing device can be applied not only to motorcycles, motorized bicycles, and railways, but also to arbitrary devices that communicate with moving mobile objects such as pedestrians, ships, and aircraft.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

The invention claimed is:

1. A radio wave map providing device for receiving a radio wave map request from a radio wave map acquisition-utilization device mounted on a mobile object and transmitting necessary information, the radio wave map providing device comprising:

a radio wave map storage configured to store a radio wave map including reference position information indicating a reference position and reference communication quality information indicating a communication quality at the reference position;

a receiver configured to receive the radio wave map request including movement section information indicating a movement schedule section of the mobile object and request communication quality information indicating a requested communication quality;

a computer and memory configured to:

compare, in the reference communication quality information at the reference position in the movement schedule section, an information amount of reference communication quality information equal to or greater than the request communication quality information with an information amount of reference communication quality information equal to or less than the request communication quality information, and generate a radio wave map reply based on provision reference communication quality information that is the reference communication quality information having a smaller information amount and provision reference position information that is reference position information according to the reference communication quality information; and a transmitter configured to transmit the radio wave map reply.

2. The radio wave map providing device according to claim 1, wherein:

the radio wave map request further includes current position information indicating a current position of the mobile object, the computer and memory are further configured to generate a first radio wave map reply including the provision reference position information or a second radio wave map reply including the provision reference position information and the provision reference communication quality information, when an interval between the current position and the reference position indicated by the provision reference position information is equal to or greater than a predetermined threshold, the transmitter transmits the first radio wave map reply, and when the interval between the current position and the reference position indicated by the provision reference position information is equal to or less than the predetermined threshold, the transmitter transmits the second radio wave map reply.

3. The radio wave map providing device according to claim 2, wherein the receiver is configured to further receive, from the radio wave map acquisition-utilization device, a second position information indicating a second current position of the mobile object that has moved from a first current position that is the current position, and when an interval between the second current position and the reference position indicated by the provision reference position information is equal to or less than the predetermined threshold, the transmitter transmits the second radio wave map reply.

4. The radio wave map providing device according to claim 2, further comprising a radio wave map reply storage configured to store the second radio wave map reply, wherein when the receiver receives change information indicating a change of the movement schedule section from the radio wave map acquisition-utilization device, the second radio wave map reply stored in the radio wave map reply storage is deleted.

5. The radio wave map providing device according to claim 1, wherein the reference position information indicates a section from a first reference position to a second reference position, and the reference communication quality information indicates a representative value of the communication quality in the section.

6. The radio wave map providing device according to claim 1, wherein:

the computer and memory are further configured to:

calculate a schedule time at which the mobile object moves at the reference position indicated by the provision reference position information, and generate the radio wave map reply including schedule time information indicating the schedule time and the provision reference communication quality information.

7. The radio wave map providing device according to claim 1, wherein:

the computer and memory are further configured to determine whether the transmitter has transmitted a first radio wave map reply that is the radio wave map reply generated based on the provision reference position information and the provision reference communication quality information to a second mobile object different from a first mobile object that is the mobile object, upon determining that the transmitter has not transmitted the first radio wave map reply, the computer and memory generate the first radio wave map reply based on the provision reference position information and the provision reference communication quality information, upon determining that the transmitter has transmitted the first radio wave map reply, the computer and memory generate a second radio wave map reply for instruction of acquisition of the first radio wave map reply from the second mobile object.

8. The radio wave map providing device according to claim 1, wherein:

the computer and memory are further configured to generate the radio wave map reply including the provision reference position information and the provision reference communication quality information, and a granularity of each of the provision reference position information and the provision reference communication quality information becomes larger as a movement speed of the mobile object in the movement schedule section increases.

9. A radio wave map providing method performed by a radio wave map providing device for receiving a radio wave map request from a radio wave map acquisition-utilization device mounted on a mobile object and transmitting necessary information, wherein:

the radio wave map providing device includes a computer and a radio wave map storage configured to store a radio wave map including reference position information indicating a reference position and reference communication quality information indicating a communication quality at the reference position, and the radio wave map providing method is executed by the computer and includes:

receiving, with a receiver connected to the computer, the radio wave map request including movement section information indicating a movement schedule section of the mobile object and request communication quality information indicating a requested communication quality;

comparing, with the computer, in the reference communication quality information at the reference position in the movement schedule section, an information amount of reference communication quality information equal to or greater than the request communication quality information with an information amount of reference communication quality information equal to or less than the request communication quality information;

in response to the comparing, generating, with the computer, a radio wave map reply based on provision reference communication quality information that is the reference communication quality information with a smaller information amount, as determined by the comparing, and provision reference position information that is reference position information corresponding to the reference communication quality information; and transmitting, with a transmitter connected to the computer, the radio wave map reply.

10. A non-transitory computer readable medium storing a radio wave map providing program executable by a processor for receiving a radio wave map request from a radio wave map acquisition-utilization device mounted on a mobile object and transmitting necessary information, the non-transitory computer readable medium storing a radio wave map including reference position information indicating a reference position and reference communication quality information indicating a communication quality at the reference position, wherein the radio wave map providing program comprises instructions configured to, when executed by a processor, cause the processor to:

cause a receiver to receive the radio wave map request including movement section information indicating a movement schedule section of the mobile object and request communication quality information indicating a requested communication quality;

compare, in the reference communication quality information at the reference position in the movement schedule section, an information amount of reference communication quality information equal to or greater than the request communication quality information with an information amount of reference communication quality information equal to or less than the request communication quality information;

generate a radio wave map reply based on provision reference communication quality information that is the reference communication quality information with a smaller information amount and provision reference position information that is reference position information according to the reference communication quality information; and cause a transmitter to transmit the radio wave map reply.

* * * * *